United States Patent
Jeong et al.

(10) Patent No.: US 8,665,305 B2
(45) Date of Patent: Mar. 4, 2014

(54) MICROPHONE ARRAY APPARATUS HAVING HIDDEN MICROPHONE PLACEMENT AND ACOUSTIC SIGNAL PROCESSING APPARATUS INCLUDING THE SAME

(75) Inventors: Jae-Hoon Jeong, Yongin-si (KR);
Jeong-Su Kim, Yongin-si (KR);
Kwang-Cheol Oh, Yongin-si (KR);
So-Young Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/181,568

(22) Filed: Jul. 13, 2011

(65) Prior Publication Data

US 2012/0169826 A1 Jul. 5, 2012

(30) Foreign Application Priority Data

Jan. 4, 2011 (KR) .................... 10-2011-0000580

(51) Int. Cl.
*H04N 7/14* (2006.01)

(52) U.S. Cl.
CPC ...................... *H04N 7/14* (2013.01)
USPC .............. 348/14.01; 348/207.99; 348/14.08; 381/92; 381/355

(58) Field of Classification Search
USPC ............. 348/14.01–14.16; 381/92, 122, 355; 379/202.01
See application file for complete search history.

(56) References Cited

U.S. PATENT DOCUMENTS

| D471,573 S | * | 3/2003 | Hovanky et al. ............ D16/202 |
| 2007/0009114 A1 | * | 1/2007 | Kenoyer et al. ............... 381/122 |
| 2008/0101576 A1 | * | 5/2008 | Vernick .................... 379/202.01 |

* cited by examiner

*Primary Examiner* — Melur Ramakrishnaiah
(74) *Attorney, Agent, or Firm* — NSIP Law

(57) ABSTRACT

A microphone array apparatus is provided. The microphone array apparatus includes a plurality of first type microphones which are disposed to be hidden in a direction of a target source and surrounded by a cover that passes acoustic signals therethrough, and a plurality of second type microphones which are disposed at both sides of the plurality of first type microphones.

18 Claims, 8 Drawing Sheets

MICROPHONE ARRAY APPARATUS HAVING HIDDEN MICROPHONE PLACEMENT AND ACOUSTIC SIGNAL PROCESSING APPARATUS INCLUDING THE SAME

CROSS-REFERENCE TO RELATED APPLICATION

This application claims the benefit under 35 U.S.C. §119 (a) of Korean Patent Application No. 10-2011-0000580, filed on Jan. 4, 2011, in the Korean Intellectual Property Office, the entire disclosure of which is incorporated herein by reference for all purposes.

BACKGROUND

1. Field

The following description relates to a microphone array apparatus having a hidden microphone placement and an acoustic signal processing apparatus including the same.

2. Description of the Related Art

As mobile convergence terminals including high-tech medical equipment such as high precision hearing aids, mobile phones, UMPCs (ultra-mobile PC), camcorders, etc. are becoming more prevalent today, the demand for application products using a microphone array has been increasing. A microphone array is constituted by multiple microphones to obtain subsidiary features of sound involving directivity, in addition to obtaining the sound itself. For example, the subsidiary features of sound involving directivity include a direction of sound or a location of sound sources. The directivity is to increase the sensitivity to a sound source signal of a sound source. The sound source signal of a sound source is located in a predetermined direction, based on a difference in time taken until sound source signals arrive at each of the multiple microphones constituting the microphone array. If sound source signals are obtained in the above manner using a microphone array, a sound source signal input in a predetermined direction may be enhanced or suppressed.

However, such a microphone array is installed to be exposed outside an electronic device. The location of the installation causes a difficulty in improving the exterior design of the electronic device having the microphone array.

SUMMARY

In one general aspect, a microphone array apparatus is provided. The microphone array apparatus includes a plurality of first type microphones which are disposed to be hidden in a direction of a target source and surrounded by a cover that passes acoustic signals therethrough, and a plurality of second type microphones which are disposed at both sides of the plurality of first type microphones.

The plurality of first type microphones may include a pair of first type microphones, and is a partition may be formed between the pair of first type microphones to concentrate received acoustic signals to each of the pair of first type microphones.

The plurality of first type microphones may be spaced apart from each other at an interval smaller than an interval of the plurality of second type microphones such that the plurality of first type microphones receive higher frequency range acoustic signals than acoustic signals received by the plurality of second type microphones.

The plurality of first type microphones may be disposed facing the direction of the target source to receive acoustic signals in the direction of the target sound.

The plurality of second type microphones may be disposed facing upward, and each of the plurality of second type microphones may be an omni-directional microphone having a maximum sensitivity to all directions.

The cover may have a cubical shape and each of a front surface, an upper surface, a lateral surface and a rear surface of the cover may have a plurality of lattice windows to transmit energy of the acoustic signals to the plurality of first type microphones.

The first type microphones and the second type microphones may be disposed in a linear configuration.

The first type microphones and the second type microphones may be disposed in a non-linear configuration.

In another aspect, an acoustic signal processing apparatus includes a microphone array comprising a plurality of first type microphones which are disposed to be hidden in a direction of a target source and surrounded by a cover that passes acoustic signals therethrough, and a plurality of second type microphones which are disposed at both sides of the plurality of first type microphones, and an acoustic signal processing unit configured to perform a signal processing on acoustic signals received to the microphone array.

The plurality of first type microphones may include a pair of first type microphones, and is a partition may be formed between the pair of first type microphones to concentrate received acoustic signals to each of the pair of first type microphones.

The plurality of first type microphones may be spaced apart from each other with an interval smaller than an interval of the plurality of second type microphones such that the plurality of first type microphones receive higher frequency range acoustic signals than acoustic signals received to the plurality of second type microphones.

The cover may have a cubical shape and each of a front surface, an upper surface, a lateral surface and a rear surface of the cover may have a plurality of lattice windows to transmit energy of the acoustic signals to the plurality of first type microphones.

The acoustic signal processing apparatus may include a photographing unit that takes pictures. The plurality of first microphones may be disposed at a rear side of the photographing unit with respect to the direction of the target source such that the plurality of first microphones are hidden by the photographing unit.

The acoustic signal processing unit may include a communication unit that sends another apparatus the pictures and the acoustic signals having been subject to the signal processing.

An electronic apparatus capable of performing a video call with another apparatus may including the acoustic signal processing apparatus.

The microphone array may be disposed at an upper side of the electronic apparatus.

The plurality of first type microphones may be disposed to be hidden in a direction of a target source and surrounded by a cover passing acoustic signals therethrough and the plurality of second type microphones may be disposed at both sides of the plurality of first type microphones. A microphone array may be additionally disposed at a lateral side of the electronic apparatus.

In yet another aspect, an electronic device includes a microphone array apparatus including a plurality of first type microphones disposed to be visually obscured in a direction of a is target source, a cover that surrounds the plurality of first type microphones and that passes acoustic signals therethrough, and a plurality of second type microphones which are disposed outside the cover with respect to the plurality of first type microphones and dispose at at least one side of the cover. Other features and aspects may be apparent from the following detailed description, the drawings, and the claims.

Figure 1:
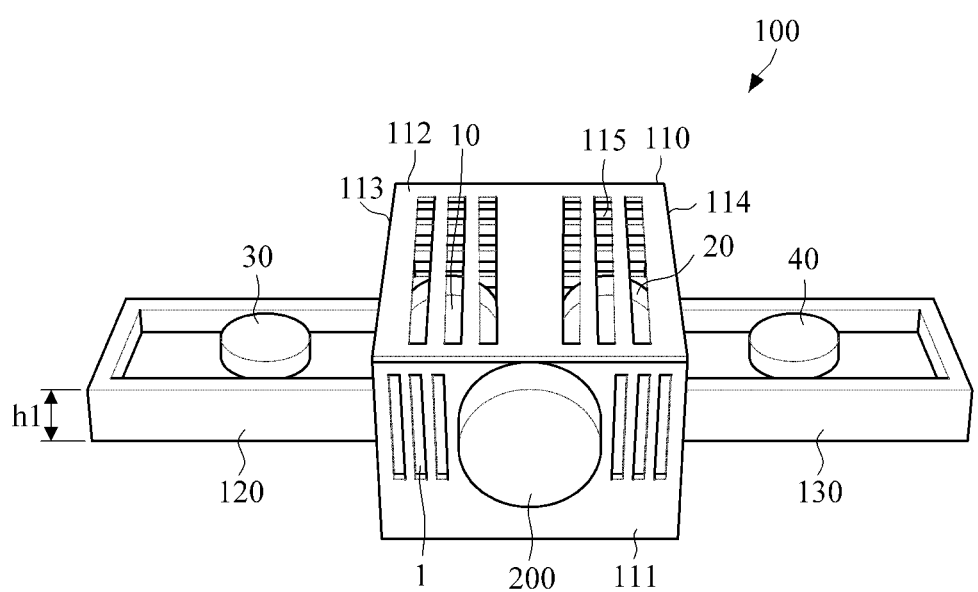
FIG. 1 illustrates an example of an exterior of a microphone array apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings.

FIG. 1 illustrates an example of the exterior of a microphone array apparatus.

A microphone array apparatus 100 includes a plurality of microphones 10, 20, 30 and 40.

The four microphones 10, 20, 30 and 40 may be disposed in a linear configuration or a non-linear configuration. At least two microphones 10 and 20 of the plurality of microphones 10, 20, 30 and 40 may be hidden from a target source and may be surrounded by a cover 110 that passes acoustic signals from the target source to the at least two microphones 10 and 20.

As a non-limiting example, the cover 110 may have a cubical shape. As another example, the cover 110 may have a spherical shape. The cover 110 may be provided in various shapes as long as the microphones 10 and 20 are hidden by the cover 110 and not capable of being seen from the front side of the microphone array apparatus 100. The cover 110 having a cubical shape may have a front surface 111, an upper surface 112, lateral surfaces 113 and 114 and a rear surface 115. Each surface having a plurality of lattice windows 1 to transmit the energy of acoustic signals to the plurality of microphones 10 and 20. In FIG. 1, as a non-limiting example, the lattice window 1 has a rectangular shape. As another example, the lattice window may be provided in the shape of a pentagon, a hexagon, a circle, or the like.

An additional unit 200 having a predetermined function may be provided at the front surface 111 of the cover 110. For example, the additional unit 200 may be a camera. However, the front surface 111 of the cover 110 may not have the additional unit 200 attached thereto. In other words, similar to the upper surface 112, the front surface 111 may be implemented as a plate having lattice windows.

The microphones 10 and 20 hidden by the cover 110 may be referred to as first type microphones, and the microphones 30 and 40 disposed outside the cover 110 may be referred to as second type microphones.

The first type microphones 10 and 20 are spaced apart from each other at an interval smaller than an interval of the second type microphones 30 and 40 such that the first type microphones 10 and 20 more effectively receive high frequency range acoustic signals from a target source than acoustic signals received by the second type microphones 30 and 40. The second type microphones 30 and 40 are disposed at both sides of the first type microphones 10 and 20 hidden by the cover 110. The second type microphones 30 and 40 may be disposed on supporting plates 120 and 130 each having a groove, respectively.

The second type microphone 30 is disposed in the groove of the supporting plate 120, and the supporting plate 120 may surround the groove and may have a height (h1) preventing the second type microphone 30 from being seen at an area at the front side of the microphone array apparatus 100. For example, the groove may have a height substantially identical to the height of the second type microphone 30. Similarly, the second type microphone 40 is disposed in the groove of the supporting plate 130, and the supporting plate 130 may surround the groove and may have a height (h1) preventing the second type microphone 40 from being seen at an area at the front side of the microphone array apparatus 100.

Although the microphone array apparatus 100 shown in FIG. 1 includes four microphones 10, 20, 30 and 40, the number of microphones included in the microphone array apparatus 100 is not limited to four microphones. As another example, the microphone array apparatus 100 may include more than four microphones.

Figure 2:
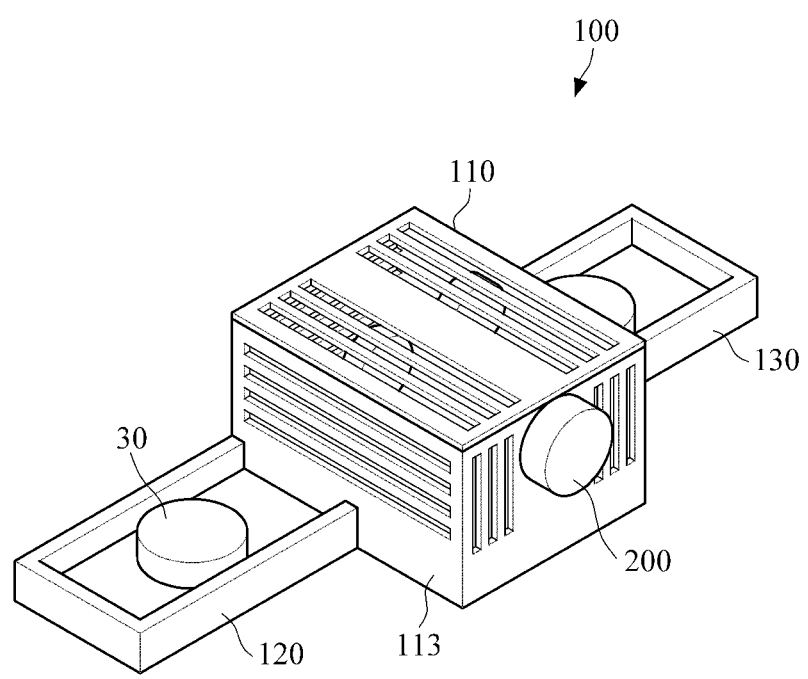
FIG. 2 illustrates an example of the exterior of the microphone array apparatus when viewed sidewise with respect to a front side of the microphone array apparatus.

FIG. 2 illustrates an example of the exterior of the microphone array apparatus when viewed sidewise with respect to the front side of the microphone array apparatus.

As shown in FIG. 2, the lateral surface 113 of the cover 110 accommodating the first type microphones 10 and 20 has a plurality of lattice windows to transmit the energy of acoustic signals to the first type microphones 10 and 20.

Figure 3:
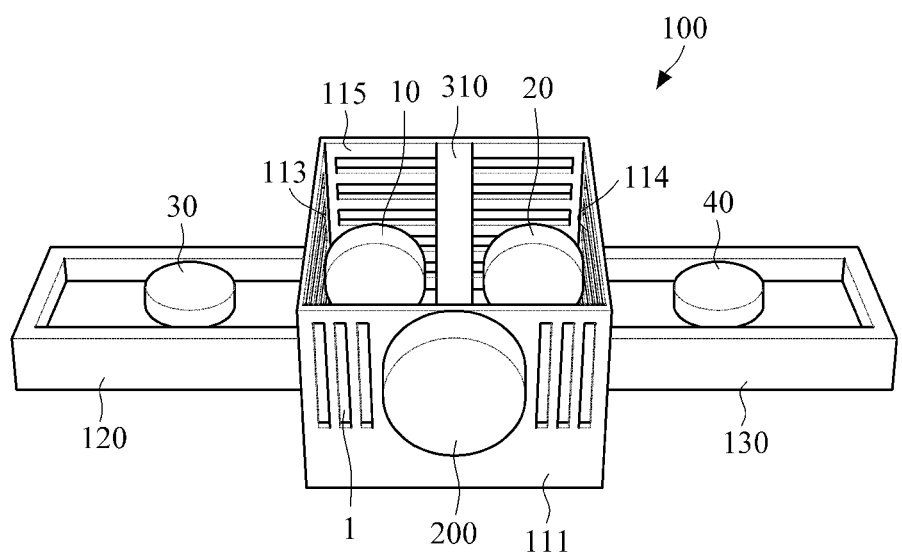
FIG. 3 illustrates an example of a placement of microphones of the microphone array apparatus.

FIG. 3 illustrates an example of a placement of microphones of the microphone array apparatus.

In FIG. 3, the cover 110 is shown without the upper surface 112 to clarify the structure of the microphone array apparatus 100 of FIG. 1. The rear surface 115 of the cover 110 also has a plurality of lattice windows to transmit the energy of acoustic signals to the first type microphones 10 and 20.

A partition 310 is formed between the first type microphones 10 and 20 to concentrate received acoustic signals to the first type microphones 10 and 20, respectively. The partition 310 may be formed using material that prevents acoustic signals from being transmitted between the first type microphones 10 and 20.

The first type microphones 10 and 20 are disposed facing the direction of a target sound such that the first type microphones 10 and 20 receive acoustic signals in the direction of the target sound. In a higher frequency range, acoustic signals are not significantly diffracted. Accordingly, in response to the first type microphones 10 and 20 being surrounded by the cover 110 and disposed at the rear side of the cover 110, the energy of high frequency range acoustic signals arriving at the first type microphones 10 and 20 is attenuated.

In this regard, in the case where a target sound is input from the front side of the microphone array apparatus 100 and the first type microphones 10 and 20 are disposed to receive high frequency range acoustic signals as shown in FIG. 3, the first type microphones 10 and 20 are disposed facing the front side of the microphone array apparatus 100. Thus, the disposition of the first type microphones 10 and 20 prevent the energy of high frequency range acoustic signals arriving at the first type microphones 10 and 20 from being attenuated.

In a lower frequency range, acoustics signals are significantly diffracted compared to a higher frequency range. Accordingly, as shown in FIG. 3, the second type microphones 30 and 40 may be disposed facing the upper side of the microphone array apparatus 100. However, in response to the second type microphones 30 and 40 being disposed facing the upper side of the microphone array apparatus 100, each of the second type microphones 30 and 40 is implemented using an omni-directional microphone having a maximum sensitivity to all directions such that the energy of acoustic signals received to the second type microphones 30 and 40 is maintained.

Figure 4:
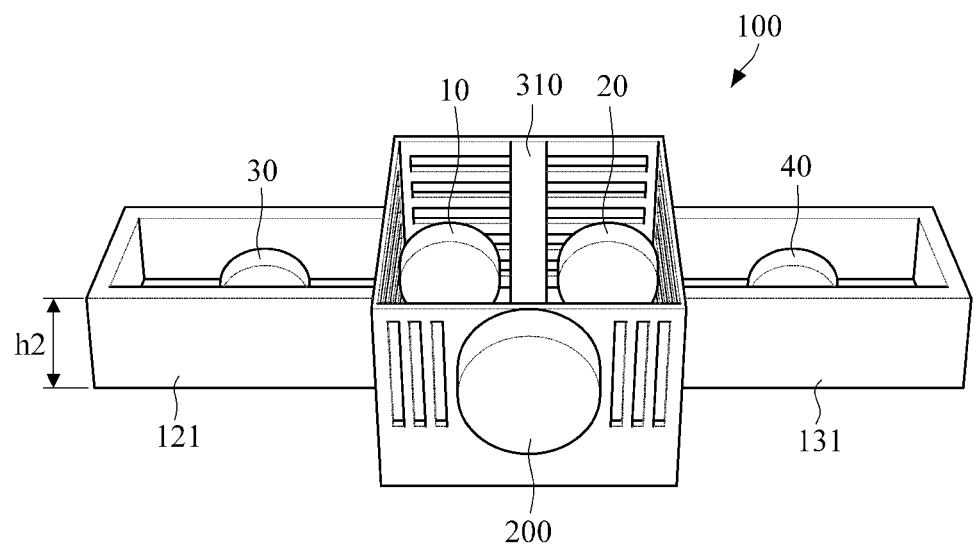
FIG. 4 illustrates another example of a placement of microphones of the microphone array apparatus.

FIG. 4 illustrates another example of a placement of microphones of the microphone array apparatus.

The microphone array apparatus 100 of FIG. 4 has the same structure as that of the microphone array apparatus 100 shown in FIG. 3 except for the placement of the second type microphones 30 and 40 and the shape of supporting plates 121 and 131. Different from the placement of the second type microphones 30 and 40 of FIG. 3, the second type microphones 30 and 40 of FIG. 4 are disposed facing the front side of the microphone array apparatus 100 and are similarly placed like the first type microphones 10 and 20. In other words, the second type microphones 30 and 40 may be disposed facing the upper side (see FIG. 3) or the front side (see FIG. 4) of the microphone array apparatus 100.

In response to the second type microphones 30 and 40 being disposed facing the upper side of the microphone array apparatus 100, the amount of energy transmitted upward is small even in response to the diffraction of sound occurring. Accordingly, the second type microphones 30 and 40 are implemented using an omni-directional microphone instead of a unidirectional microphone. However, in response to the second type microphones 30 and 40 being disposed facing the front side of the microphone array apparatus 100, the second type microphones 30 and 40 may be implemented using a unidirectional microphone having a maximum sensitivity to the sound that is input from the front side of the microphones as well as an omni-directional microphone in maintaining the energy input of acoustic signals.

The second type microphone 30 is disposed in a groove of the supporting plate 121, and the second type microphone 40 is disposed in a groove of the supporting plate 131. The supporting plates 121 and 131 respectively surround the grooves and have a height (h2) preventing the second type microphones 30 and 40 from being seen at an area at the front side of the microphone array apparatus 100.

The configuration of this example prevents the energy of acoustic signals arriving at the microphone array from being attenuated while preventing the microphone array from being seen. Accordingly, the external appearance of the electronic device equipped with the microphone array is improved and the acoustic signals are effectively received.

Figure 5:
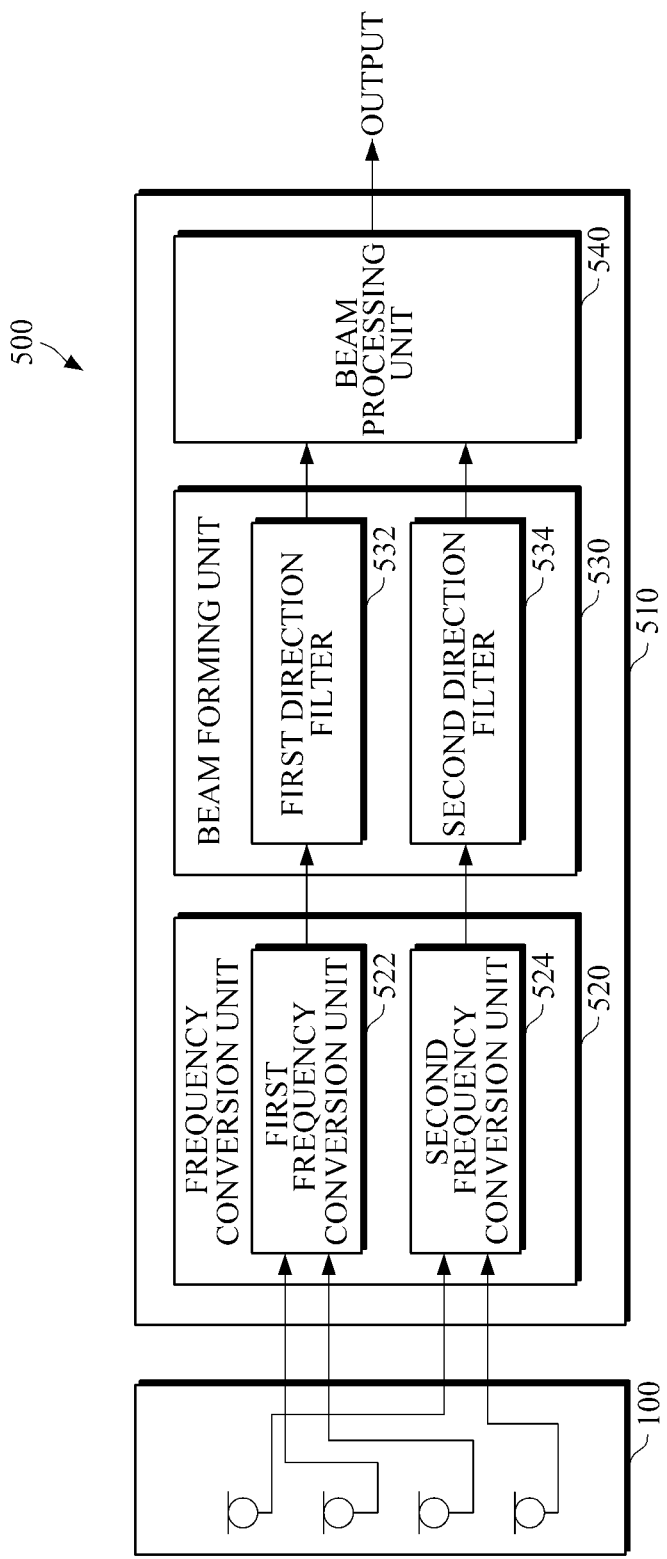
FIG. 5 illustrates an example of a configuration of an acoustic signal processing apparatus including the microphone array apparatus of FIG. 1.

FIG. 5 illustrates an example of the configuration of an acoustic signal processing apparatus including the microphone array apparatus of FIG. 1.

An acoustic signal processing apparatus 500 includes a microphone array apparatus 100 and an acoustic signal processing unit 510. The microphone array apparatus 100 serves as an acoustic signal input unit of the acoustic signal processing apparatus 500. The microphone array apparatus 100 shown in FIG. 5 has substantially the same structure as the microphone array apparatus 100 described above with reference to FIGS. 1 to 4.

The acoustic signal processing unit 510 may include a frequency conversion unit 520, a beam forming unit 530 and a beam processing unit 540.

The frequency conversion unit 520 may transform acoustic signals, which are input through the acoustic signal input unit, into acoustic signals of frequency domain. For example, the frequency conversion unit 520 transforms acoustic signals of time domain into acoustic signals of frequency domain based on a discrete Fourier transform (DFT) or a fast Fourier transform (FFT). The frequency conversion unit 520 may make acoustic signals, which are input at each time, into a frame and may transform the acoustic signals of a frame into acoustic signals of frequency domain. A unit for framing may be determined based on the sampling frequency and the type of application.

The frequency conversion unit 520 includes a first frequency conversion unit 522 and a second frequency conversion unit 524. The first frequency conversion unit 522 transforms acoustic signals, which are received from the first type microphones 10 and 20, into acoustic signals of frequency domain. The second frequency conversion unit 524 transforms acoustic signals, which are received from the second type microphones 30 and 40, into acoustic signals of frequency domain.

The beam forming unit 530 generates beams for the acoustic signals received from the first frequency conversion unit 522 and the second frequency conversion unit 524. The beam forming unit 530 may include a first direction filter 532 that generates beams based on the acoustic signals received from the first frequency conversion filter 522 and a second direction filter 534 that generates beams based on the acoustic signals received from the second frequency conversion unit 524. Each of the first direction filter 532 and the second direction filter 534 filters acoustic signals of a predetermined direction. The predetermined direction may represent an angle range including the direction of the target sound. The direction of the target sound may include a predetermined direction angle including the angle of 0° with respect to the front side of the microphone array apparatus.

Since the first type microphones 10 and 20 are disposed to receive high frequency range acoustic signals in relation to the second type microphones 30 and 40, the output of the first is direction filter 532 includes a beamforming result of the high frequency range acoustic signals and the output of the second direction filter 534 includes a beamforming result of the low frequency range acoustic signals. In FIG. 5, as a non-limiting example, the beam forming unit 530 performs beamforming based on the first and second direction filters 532 and 534. As another example, the beamforming may be performed by various schemes such as, for example, controlling the delay of received acoustic signals or using the phase difference of received acoustic signals.

The beam processing unit 540 performs a summation operation of combining the outputs of the first direction filter 532 and the second direction filter 534. The beam processing unit 540 may be configured to perform various types of acoustic signals processing such as, for example, gain control and noise reduction.

Figure 6:
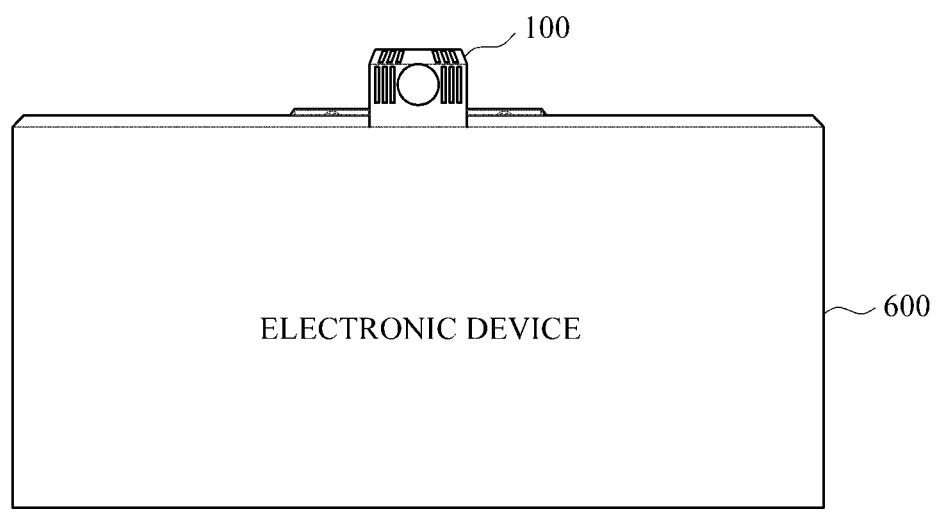
FIG. 6 illustrates an example of the exterior of an electronic device equipped with the microphone array apparatus of FIG. 1.

FIG. 6 illustrates an example of the exterior of an electronic device equipped with the microphone array apparatus of FIG. 1.

The microphone array apparatus 100 of FIG. 6 may have a similar structure as that of the microphone array apparatus 100 described with reference to FIGS. 1 to 4. As shown in FIG. 6, the microphone array apparatus 100 may be disposed at an upper side of the electronic device 600. The electronic device 600 may be implemented using as various types of devices such as large display apparatus, personal computers, laptop devices, mobile phones, SmartPhones, Personal Digital Assistants (PDA), Portable Multimedia Player (PMP), MPEG Audio Layer-3(MP3) players, etc. The large display apparatus may include televisions and monitors. The type of the electronic device is not limited thereto.

The microphone array apparatus 100 may be disposed on the upper middle side of the electronic device 600, and may form beams in the direction of the front side of the microphone array apparatus 100. The microphone array apparatus 100 receives a target sound that is input from the front side of the electronic device 600.

Figure 7:
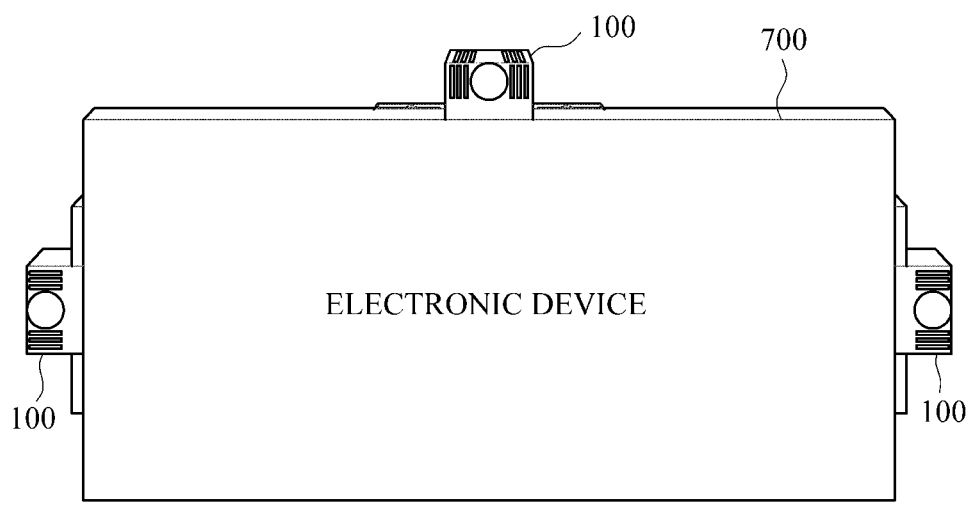
FIG. 7 illustrates another example of the exterior of an electronic device equipped with the microphone array apparatus of FIG. 1.

FIG. 7 illustrates another example of the exterior of an electronic device equipped with the microphone array apparatus of FIG. 1.

The microphone array apparatus 100 above described with reference to FIGS. 1 to 4 may be disposed at one lateral side or both lateral sides of an electronic device 700 in addition to the upper side of the electronic device 700 as shown in FIG. 7. Similar to the electronic device 600 of FIG. 6, the electronic device 700 may be implemented using as various types of devices.

The microphone array apparatus 100 is disposed on the upper middle side and both lateral sides of the electronic device 700, and the microphone array apparatus 100 forms beams in the direction of the front side of the microphone array apparatus 100, thereby effectively receiving a target sound that is input from the front middle side of the electronic device 700.

Figure 8:
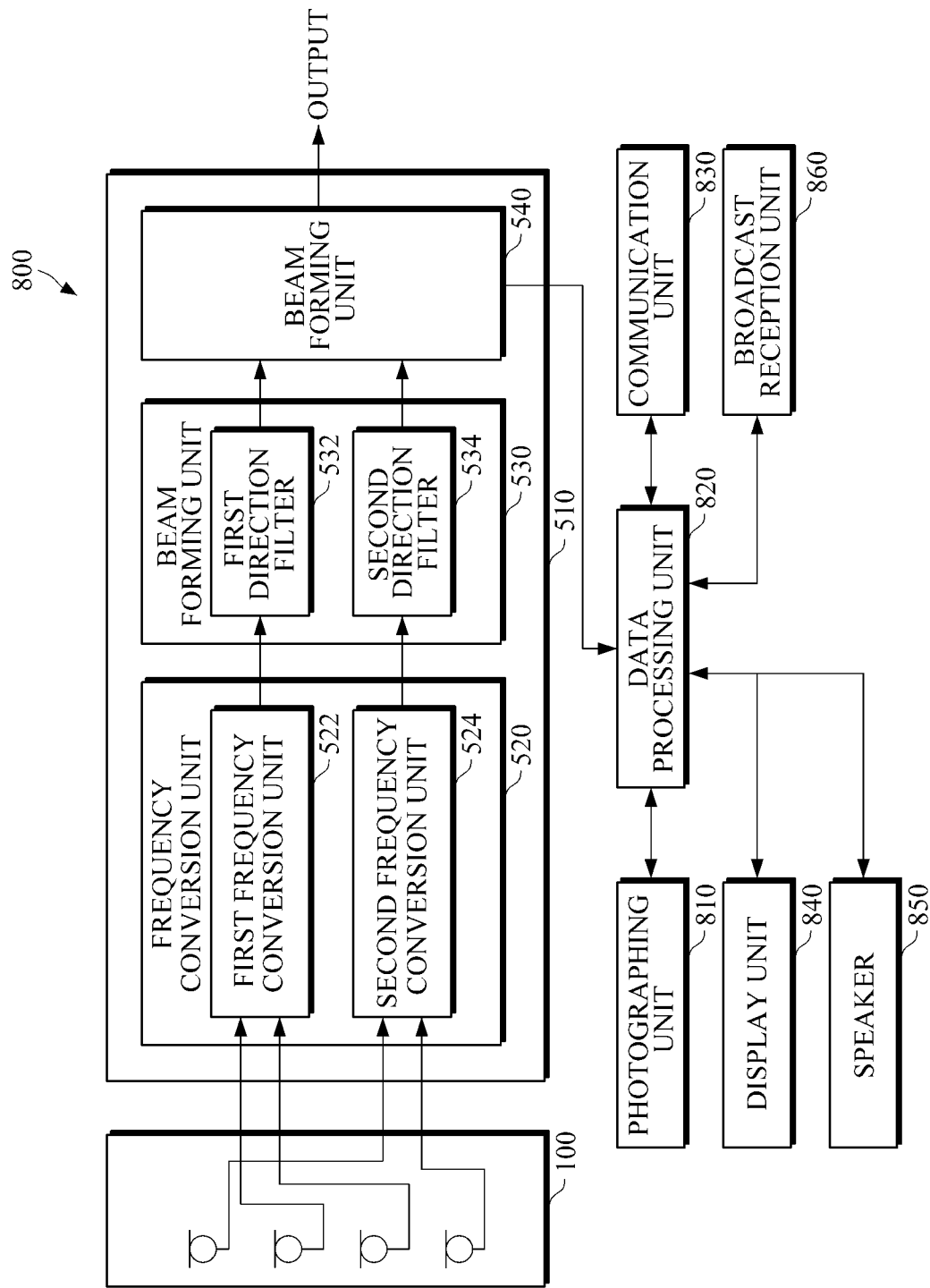
FIG. 8 illustrates an example of the configuration of the electronic device of FIG. 6.

FIG. 8 illustrates an example of the configuration of the electronic device of FIG. 6.

An electronic device 800 may further include a photographing unit 810, a data processing unit 820, a communication unit 830, a display unit 840, a speaker 850 and a broadcast reception unit 860 in addition to the acoustic signal processing apparatus 500, shown in FIG. 5, including the microphone array apparatus 100 and the acoustic signal processing unit 510, thereby performing a broadcast reception and a video call.

The microphone array apparatus 100 serves as an acoustic signal input unit of the acoustic signal processing apparatus 500. The microphone array apparatus 100 shown in FIG. 8 has the same structure as that of the microphone array apparatus 100 above described with reference to FIGS. 1 to 4. The acoustic signal processing unit 510 may include a frequency conversion unit 520, a beam forming unit 530 and a beam processing unit 540. Since the structures of the microphone array apparatus 100 and the acoustic signal processing unit 510 of FIG. 8 are substantially similar to those described with reference to FIG. 5, description of the structures are omitted.

Similar to a camera, the photographing unit 810 may include modules of lenses, image sensors, such as charge-coupled devices (CCD) and complementary metal-oxide-semiconductor (CMOS), and an analog-to-digital (A/D) convertor. The photographing unit 810 acquires an image signal that is generated through capturing an object, converts the acquired image signal into a digital signal and transmits the digital signal into the data processing unit 820. The photographing unit 810 may be implemented using the additional unit 200 that is described with reference to FIGS. 1 to 4. In other words, the first type microphones 10 and 20 may be disposed at the rear side of the photographing unit 810 with respect to the direction of the target direction such that the first type microphones 10 and 20 are hidden.

The data processing unit 820 may perform an image processing, such as noise reduction or color sensitivity processing, on the image that is converted in the form of digital signals. The data processing unit 820 may generate a data stream including acoustic signals, which are output from the beam forming unit 540 of the acoustic signal processing apparatus 500, and the image taken by the photographing unit 810, and transmits the data stream to the communication unit 830.

The communication unit 830 may be connected to another external electronic device through a network such as wired and/or wireless internet. The communication unit 830 is configured to support a communication protocol such as Blutooth, Zigbee, Wireless LAN, Home Radio Frequency (RF), Ultra Wide Band (UWB), Wireless 1394, any other communication protocol, or a combination thereof.

The communication unit 830 may receive a data stream including an image and acoustic signals received from another electronic device and may transmit the received data stream. The data processing unit 820 converts the received data stream into a predetermined form of data suitable for outputting through the display unit 840 and the speaker 850, and outputs the converted image and the acoustic signal through the display unit 840 and the speaker 850, respectively.

The broadcast reception unit 860 may receive a broadcast program through a terrestrial broadcasting channel or a satellite broadcasting channel. As another example, the broadcast reception unit 860 may receive a broadcast program through a two-way channel such as the internet. In response to a broadcast program being received through broadcast signals, the broadcast reception unit 860 may include a tuner unit (not shown) and a de-multiplexer (not shown). The tuner unit may perform tuning and demodulation on the broadcast signal received through a predetermined channel selected by a user to output a transport stream. The de-multiplexer performs demultiplexing on the multiplexed transport stream, which is output through the tuner unit, into a video stream and an audio stream. The video stream and the audio stream are subject to a signal processing in the data processing unit 820 and then output through the display unit 840 and the speaker 850, respectively.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A microphone array apparatus comprising:
a plurality of first type microphones which are placed to be hidden in a direction of a target source and surrounded by a cover that passes acoustic signals therethrough; and
a plurality of second type microphones which are placed at both sides of the first type microphones.

2. The microphone array apparatus of claim 1, wherein the first type microphones comprise a pair of first type microphones, and
a partition is formed between the pair of first type microphones to concentrate received acoustic signals to each of the pair of first type microphones.

3. The microphone array apparatus of claim 1, wherein the first type microphones are spaced apart from each other at an interval smaller than an interval of the second type microphones such that the first type microphones receive higher frequency range acoustic signals than acoustic signals received by the second type microphones.

4. The microphone array apparatus of claim 1, wherein the first type microphones are placed facing the direction of the target source to receive acoustic signals in the direction of the target sound.

5. The microphone array apparatus of claim 1, wherein the second type microphones are placed facing upward, and each of the second type microphones is an omni-directional microphone having a maximum sensitivity to all directions.

6. The microphone array apparatus of claim 1, wherein the cover has a cubical shape and each of a front surface, an upper surface, a lateral surface and a rear surface of the cover has a plurality of lattice windows to transmit energy of the acoustic signals to the first type microphones.

7. The microphone array apparatus of claim 1, wherein the first type microphones and the second type microphones are placed in a linear configuration.

8. The microphone array apparatus of claim 1, wherein the first type microphones and the second type microphones are placed in a non-linear configuration.

9. An acoustic signal processing apparatus comprising:
a microphone array comprising a plurality of first type microphones which are placed to be hidden in a direction of a target source and surrounded by a cover that passes acoustic signals therethrough, and a plurality of second type microphones which are placed at both sides of the first type microphones; and
an acoustic signal processing unit configured to perform a signal processing on acoustic signals received to the microphone array.

10. The acoustic signal processing apparatus of claim 9, wherein the first type microphones comprise a pair of first type microphones, and
a partition is formed between the pair of first type microphones to concentrate received acoustic signals to each of the pair of first type microphones.

11. The acoustic signal processing apparatus of claim 9, wherein the first type microphones are spaced apart from each other with an interval smaller than an interval of the second type microphones such that the first type microphones receive higher frequency range acoustic signals than acoustic signals received to the second type microphones.

12. The acoustic signal processing apparatus of claim 9, wherein the cover has a cubical shape and each of a front surface, an upper surface, a lateral surface and a rear surface of the cover has a plurality of lattice windows to transmit energy of the acoustic signals to the first type microphones.

13. The acoustic signal processing apparatus of claim 9, wherein the acoustic signal processing apparatus further comprises
a photographing unit that takes pictures,
wherein the first microphones are placed at a rear side of the photographing unit with respect to the direction of the target source such that the first microphones are hidden by the photographing unit.

14. The acoustic signal processing apparatus of claim 13, wherein the acoustic signal processing unit further comprises a communication unit that sends another apparatus the pictures and the acoustic signals having been subject to the signal processing.

15. An electronic apparatus capable of performing a video call with another apparatus, the electronic apparatus including the acoustic signal processing apparatus of claim 13.

16. The electronic apparatus of claim 15, wherein the microphone array is placed at an upper side of the electronic apparatus.

17. The electronic apparatus of claim 15, wherein the first type microphones are placed to be hidden in a direction of a target source and surrounded by a cover passing acoustic signals therethrough and the second type microphones are placed at both sides of the first type microphones, and wherein a microphone array is additionally placed at a lateral side of the electronic apparatus.

18. An electronic device comprising:
a microphone array apparatus comprising:
a plurality of first type microphones placed to be visually obscured in a direction of a target source;
a cover that surrounds the first type microphones and that passes acoustic signals therethrough; and
a plurality of second type microphones which are placed outside the cover with respect to the plurality of first type microphones and are placed at at least one side of the cover.

* * * * *